April 14, 1970  C. P. MAJKRZAK  3,506,841
OCEANOGRAPHIC DATA-COLLECTING BUOY ARRANGEMENT
Filed March 2 1967  3 Sheets-Sheet 2

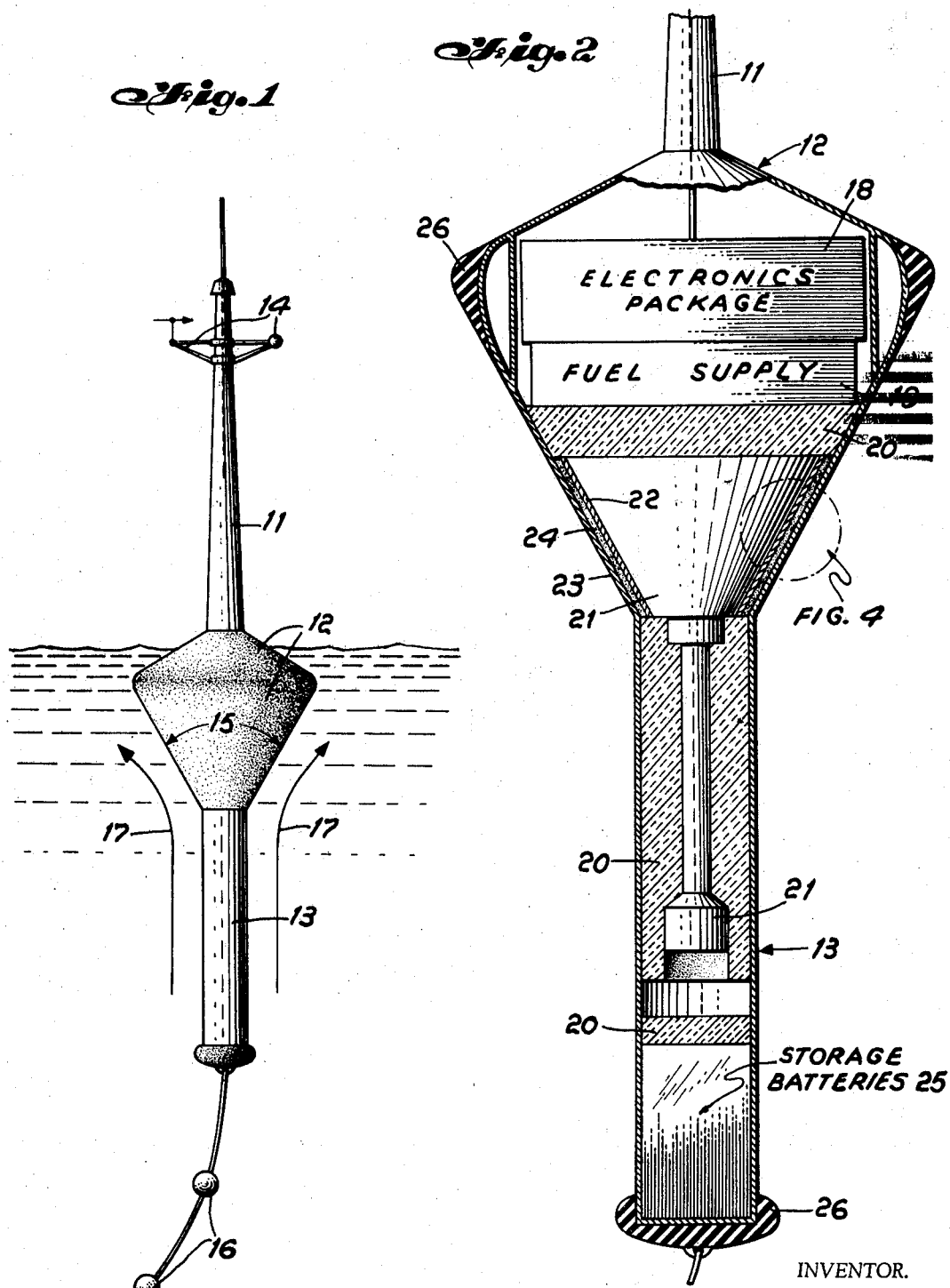

INVENTOR.
CHARLES P. MAJKRZAK
BY
ATTORNEY

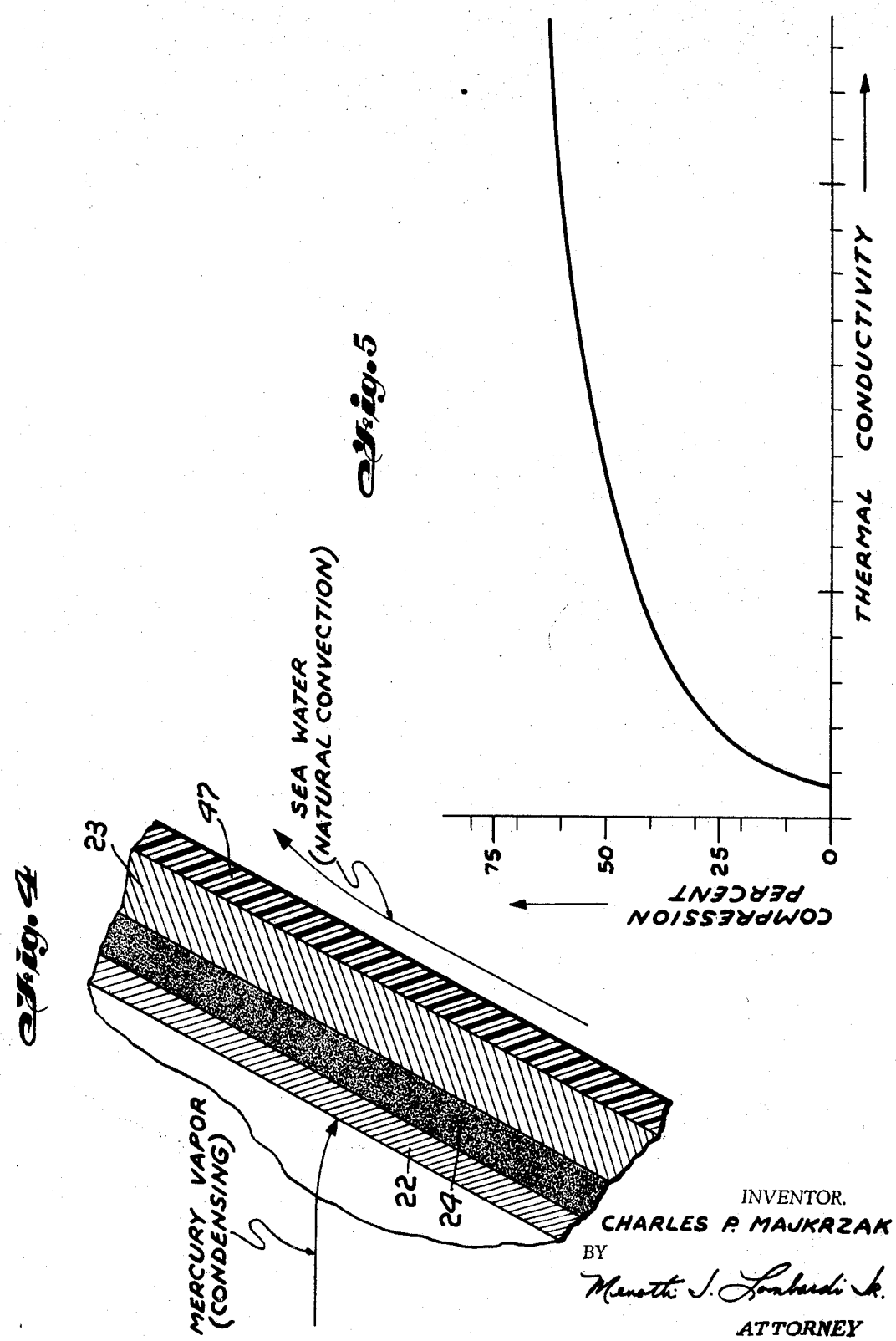

United States Patent Office
3,506,841
Patented Apr. 14, 1970

3,506,841
OCEANOGRAPHIC DATA-COLLECTING BUOY ARRANGEMENT
Charles P. Majkrzak, Nutley, N.J., assignor to International Telephone and Telegraph Corporation, Nutley, N.J., a corporation of Maryland
Filed Mar. 2, 1967, Ser. No. 619,978
Int. Cl. F01d 15/10; H02k 7/18
U.S. Cl. 290—2                              4 Claims

ABSTRACT OF THE DISCLOSURE

The arrangement provides an oceanographic data-collecting buoy having a self-contained fuel supply, energy converter, electrical energy storage, and a data collecting and transmitting system. The energy converter includes a condenser arranged within the buoy so as to enhance the transfer of heat to the ocean.

---

Figure 3:
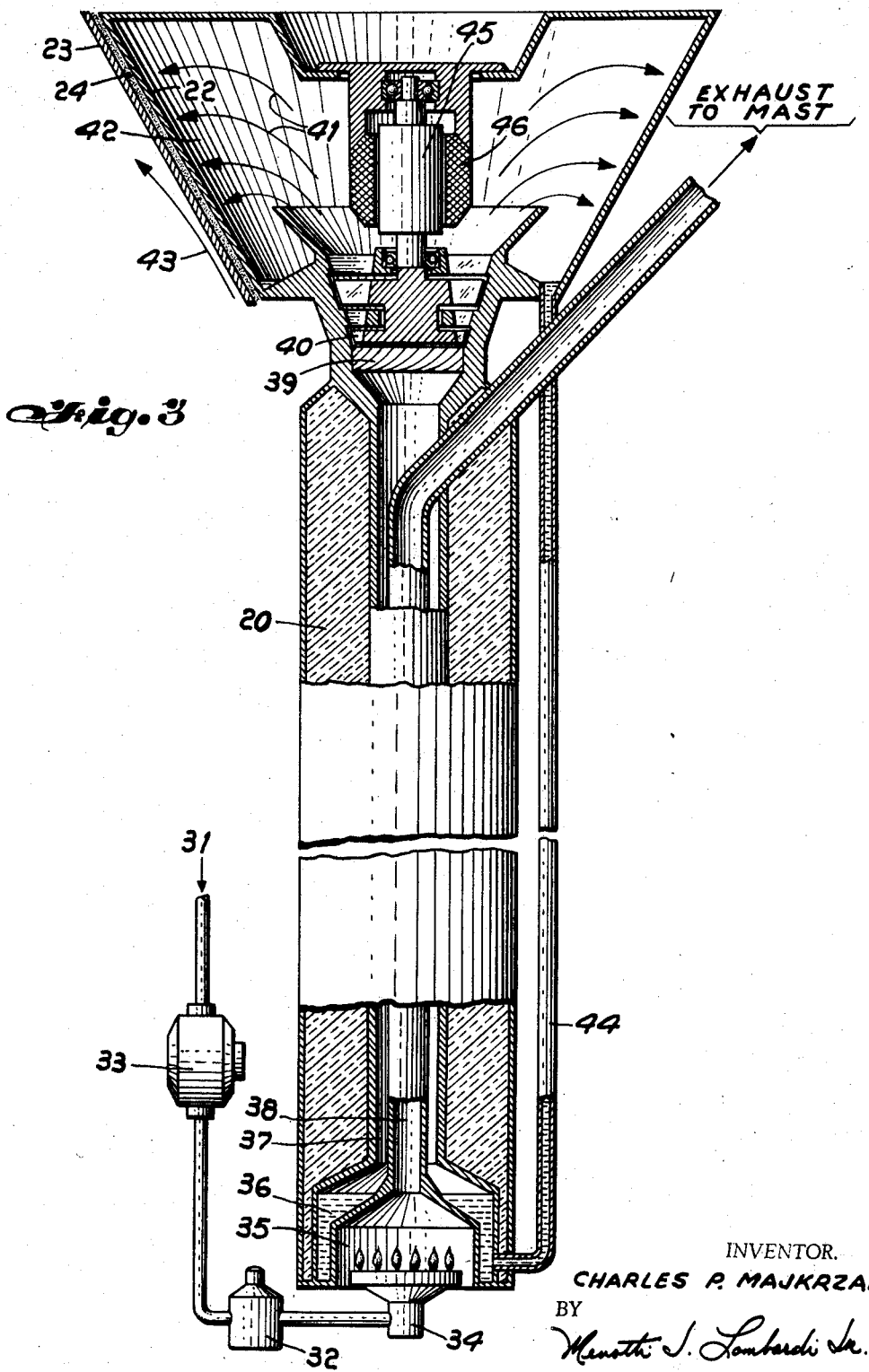

This invention relates generally to an oceanographic data-collecting buoy arrangement, and more particularly to an improved arrangement enhancing the circulation of the external sea water over the buoy's surface and optimizing transfer of heat from a contained condenser to the surrounding sea water.

An oceanographic data collecting buoy requires a device for converting some form of available energy into a useful electrical supply for long-term unattended operation of the detecting, collecting, and transmitting equipment. In one such system, the periodic burning of vaporized fuel operates a turbine-driven generator to maintain a working energy level in electrical storage batteries. Such a system for an unattended oceanographic station was described and claimed in this assignee's copending application Ser. No. 556,990, filed June 13, 1966.

The system described provides mercury vapor turbine generator in which the vapor is condensed by the free circulation of external sea water. It is therefore of primary importance in utilizing this arrangement that the buoy configuration and manufacture be such that a maximum circulation of external sea water around the condenser is maintained, and a maximum transfer of heat from the condenser to the circulating sea water is possible.

It is therefore an object of this invention to provide an improved arrangement for an oceanographic data-collecting buoy in which the composite structure of the buoy provides for the proper utilization of the space within the buoy so that a required amount of sea flow along the buoy is maintained, and the structure incorporates a means to enhance the transfer of heat from the condenser wall to the surrounding sea.

Another object of this invention is to provide a means to enhance the transfer of heat from the condenser wall through to the buoy wall regardless of deviations which ordinarily occur in the manufacture of the condenser and the buoy.

According to the broader aspects of this invention, an oceanographic data-collecting buoy arrangement is provided for a fuel supply, an energy converter, an electrical energy storage battery, a data-collecting and processing means, and a transmission system, wherein the energy converter is a mercury turbogenerator having its condenser walls in intimate contact with the buoy wall by means of a flexible, compressible, either bonded or unbonded, material having a form and composition so as to enhance the transfer of heat to the ocean.

The foregoing and other objects and features of this invention will become more apparent by reference to the following description taken in connection with the accompanying drawings, which:

FIGURE 1 is an outline of the oceanographic data-collecting buoy arrangement according to the invention;
FIGURE 2 is a sectional view of the buoy proper showing the arrangement of the electronics package, fuel supply, power package, and storage battery;
FIGURE 3 is a sectional view of the power package outlined in FIGURE 2.
FIGURE 4 is an enlarged cross sectional view of the wall composition of FIGURE 2; and
FIGURE 5 is a graph showing typical performance characteristics of a compressible material according to the invention.

Referring now to FIGURE 1, a typical buoy configuration according to the invention is shown comprising three sections 11, 12 and 13. The main section 12 is generally conically shaped with its upper and lower portions each resembling a frustum, having a maximum diameter of approximately 5 ft. The upper portion of main section 12 connects to a mast 11 containing an induction-exhaust duct, and supporting communication antennas, and meteorologic sensors 14. The height of mast 11 extends 12 to 18 ft. above the upper conical portion of main body 12. The lower conical portion of main section 12 has its conical sides 15 tapered at approximately a 60° angle towards a cylindrical portion 13 from which portion are attached oceanographic sensors and a ballast-drag network which are indicated generally at 16. The cylindrical shaped section 13 of the buoy is approximately 2 ft. in diameter and 8 to 10 ft. long.

The instant shaped design of the buoy arrangement enhances the natural convection flow of the external sea water 17 to pass over the condenser portion located within the lower conical portion of main section 12. In addition, the buoy of the instant shape has the advantage of bobbing vertically in the water for greater stability when collecting and transmitting data, than one which is arranged to pitch and roll side to side. It should be noted that the mast 11 containing the induction-exhaust ducts and any number of communication antennas, may also contain lights to warn any approaching ships of the presence of the buoy.

The buoy proper is shown in a sectional view in FIGURE 2, wherein within the main body section 12 there is contained the electronic package 18 containing the antenna tuning system, transceiver, data-collector, data-processor and integrator. Below the electronic package 18 is located the fuel supply 19 which sits above an insulating section 20. The power package section 21 begins at the lower conical section of main body 12 and extends into the cylindrical portion 13. The condenser wall 22 of the power package and the outside wall 23 of the buoy defines a section 24 containing a flexible, compressible, bonded or unbonded, graphite or carbon material. This material fills the conical space between condenser wall 22 and the exterior wall 23 of the buoy, in order to enhance the transfer of heat from wall 22 to wall 23 regardless of deviations caused in manufacture between the wall of the condenser and that of the buoy.

As can be seen from the drawing, the power supply package 21 is surrounded by insulating material 20 to increase the efficiency throughout its operating cycle. In the lowest part of cylindrical portion 13 of the buoy, there is located the storage battery section 25, wherein the energy produced in the power package is stored and made available to the electronic equipment. The maximum diameter of main section 12 is surrounded by a resilient bumper material 26 as is the lowest portion of the cylindrical section 13. This resilient bumper material protects the buoy from damage in the event of contact with ships or other objects.

The power package 12 may best be described by referring to FIGURE 3, wherein a propane vapor 31 is permitted to flow as a gaseous fuel from fuel supply 19 (FIGURE 2) when solenoid 32 is energized. Such flow is controlled by a constant head device 33 and a regulating needle valve or orifice 34 to feed burner 35. Upon ignition of the fuel with a glow coil or pilot light, the burner heats liquid mercury 36 contained in the boiler to evaporate it and to further heat its vapor in super heater section 37, by the exhaust gases in stack 38. These gases are led to the exhaust duct contained in mast 11 shown in FIGURE 1. After expansion of the superheated vapor in nozzle 39, the mercury-vapor jet rotates a wheel assembly 40 whose blades travel at a linear velocity suitable in ratio to the vapor velocity. The vapor indicated by arrows 41 thereafter reverts to liquid form in condenser 42 which is cooled by the free circulation of external sea water 43 over a portion of the buoy wall 23, that is in contact with the condenser wall 22, through the previously described filler material within the conical space 24. The condensed mercury, due to its high density is returned by gravity to the boiler in feed line 44. The rotating wheel 40 directly drives a permanent magnet rotor 45 which, in turn, causes the production of electrical energy within stator 46 which is made available to recharge batteries through appropriate circuits and controls. Such a system of circuits and controls is disclosed and claimed in the aforementioned copending application.

FIGURE 4 shows the enlarged details of the composite structure of the buoy outlined by dashed lines in FIGURE 2, comprising a condenser wall 22 of stainless steel, a compressed graphite felt 24, the buoy wall 23 of a mild carbon steel, and an anti-marine growth coating 47 surrounding the entire buoy.

Because vapor leaves the blading at a high velocity, turbulence exists within the condenser casing, and since mercury exhibits a beneficial drop-wise condensation on condenser wall 22, there is comparatively low resistance to the transfer of heat at that surface. The temperature of the mercury vapor is in the order of 247° F., and the temperature of the sea water passing by the conically shaped section due to the natural convection is in the order of 32° to 70° F. The conical configuration of the condenser offers an ideal surface for transferring heat to the external water, however, it is necessary that this heat transfer be made through the composite structure.

Ordinarily, the buoy wall would be in as close contact to the condenser wall as manufacturing would permit, so that the transfer of heat may be as high as possible. However, because of manufacturing limitations, there will be a void between the condenser wall and the buoy wall. This void, being filled with air which is a good insulator, is detrimental to the transfer of heat.

Therefore, in keeping with the objects of the invention, it is proposed that within the conical section defined by the condenser wall and the buoy, there is fixed a compressed graphite felt. When sufficiently compressed, this graphite felt has a thermal conductivity exceeding 24 B.t.u.-in. per hr. ° F. sq. ft. which is very much higher when compared to the transfer characteristics of air normally existing between the condenser wall and the buoy wall. A graph illustrating the typical performance of thermal conductivity versus compression for such a material is shown in FIGURE 5. The buoy wall, being of a mild carbon steel, has even a higher thermal conductivity than the condenser wall and effectively transfers heat to the anti-fouling jacket 47 and through it to the surrounding sea.

This composite structure results in a high rate of transfer of heat from the condenser, and in combination with the conical configuration of the buoy, optimum utilization is made of the flow of sea water as the coolant source for the mercury vapor turbogenerator system.

Unbonded graphite and carbon suitable in such an application is made by the Carborundum Company and is identified as "Graphite Felt" and "Carbon Felt." Another manufacturer with a similar material is the Union Carbide Corporation, and the material is identified as "Graphite Felt (grade WDF)." An example of bonded graphite suitable in such an application is made by Stackpole Carbon Company, and identified as "Flexible Carbon."

It should be noted that equivalent materials could comprise a woven fabric of graphite or carbon filaments, as well as metallic felts and woven fabrics, and are to be considered within the scope of this invention.

The foregoing has dealt with a novel buoy configuration in which utilization is made of the natural convection of sea water and the components are arranged within the buoy so as to derive the maximum benefit. In addition, this novel arrangement includes between the condenser wall and the buoy wall a flexible, compressible, bonded or unbonded, graphite or carbon material which fills the voids between the walls, so as to enhance the transfer of heat of the condensing vapor to the surrounding ocean.

While I have described above the principles of my invention in connection with specific apparatus, it is to be clearly understood that this description is made only by way of example and not as a limitation on the scope of my invention, as set forth in the accompanying claims.

I claim:

1. An oceanographic data-collecting buoy arrangement comprising:

a main section having generally upper and lower conically shaped portions;

a mast extending upward from the upper conical portion and having an air intake and gas exhaust duct therein;

a power package contained within said main section and extending into a cylindrical portion attached thereto, said power package including a condenser arranged within the lower conical portion and adapted to have its condenser wall in contact with the buoy wall by means for enhancing the transfer of heat from said condenser and the surrounding sea water;

a fuel supply within said main section;

said power package further including an energy converter and controls operatively connected to said fuel supply for converting an operating fluid within said converter to an operating vapor;

generating means responsive to said operating vapor for producing electrical energy; and said means for enhancing the transfer of heat from said condenser to the surrounding sea water is a flexible, compressible, bonded or unbonded graphite or carbon material.

2. An arrangement according to claim 1, wherein said material is compressed between the wall of the condenser and the wall of the buoy located in said lower conically shaped portion, and said lower conical portion cooperates with said cylindrical portion to enhance the flow of sea water by natural convection to pass over said lower conical portion, whereby said sea water acts as the coolant source for said condenser.

3. An arrangement according to claim 2 further including:

an electronic package within said main section;

a plurality of storage batteries located at the extremity of said cylindrical portion; and insulation means encapsulating said power package within said cylindrical portion, and isolating said power package from said electronic package, fuel supply, and batteries.

4. An arrangement according to claim 3, including an anti-marine growth coating surrounding the entire buoy, and resilient bumper means located at the maximum diameter of said main section and surrounding the extremities of said cylindrical portion.

References Cited

UNITED STATES PATENTS

| 2,448,713 | 9/1948 | Hansell | 9—8 XR |
| 3,061,733 | 10/1962 | Humpal | 290—50 XR |
| 3,132,322 | 5/1964 | Maes | 9—8 XR |
| 3,134,353 | 5/1964 | Pedersen et al. | 114—16.35 |
| 3,148,508 | 9/1964 | Karig | 114—16.35 XR |
| 3,369,516 | 2/1968 | Pierce | 9—8 |

GLEN R. SIMMONS, Primary Examiner

U.S. Cl. X.R.

114—16; 290—52; 307—150